W. J. McVICKER.
OILING MACHINE.
APPLICATION FILED JUNE 26, 1915.

1,169,504.

Patented Jan. 25, 1916.
2 SHEETS—SHEET 1.

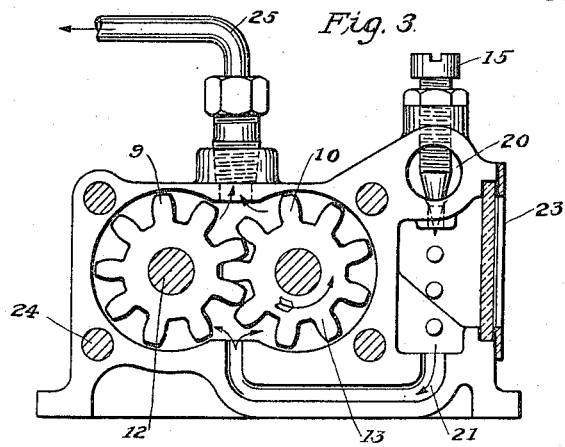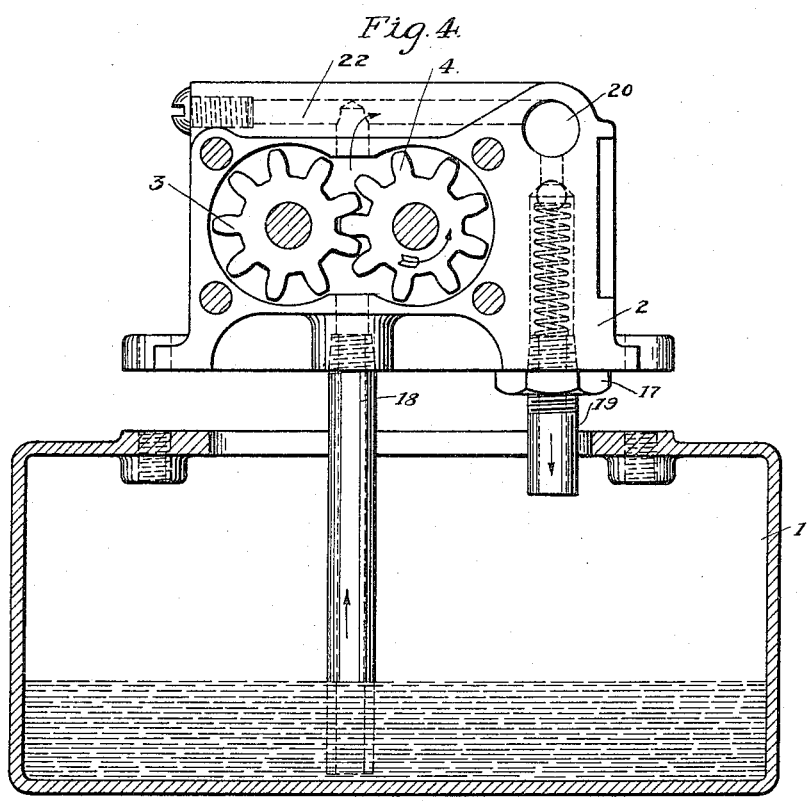

UNITED STATES PATENT OFFICE.

WALTER J. McVICKER, OF MINNEAPOLIS, MINNESOTA.

OILING-MACHINE.

1,169,504.

Specification of Letters Patent. Patented Jan. 25, 1916.

Application filed June 26, 1915. Serial No. 36,512.

*To all whom it may concern:*

Be it known that I, WALTER J. McVICKER, a citizen of the United States, residing at the city of Minneapolis, in the county of Hennepin and State of Minnesota, have invented a new and useful Oiling-Machine, of which the following is a specification.

My invention relates more particularly to oiling machines used to oil the various parts of internal combustion motors, which require constant lubrication, and the machines used in connection therewith, and is especially adapted to oil a large number of separate bearings, or other parts requiring separate oiling, uniformly, positively and under any desired pressure.

The principal objects of my invention are consequently to provide a mechanical oiler which shall be capable of positively and uniformly oiling under any desired pressure, a large number of separate parts requiring separate lubrication and to provide such a mechanism which shall operate with a minimum consumption of power, which shall be self-lubricating, and which shall not employ in its construction, parts having eccentric or intermittent motion.

I accomplish these objects by the mechanism illustrated in the accompanying drawings, in which—

Figure 2:
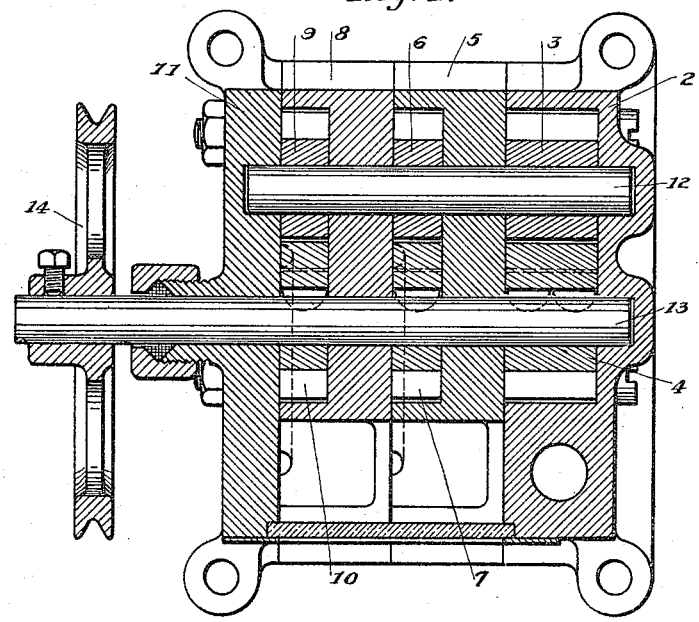
Figure 1:
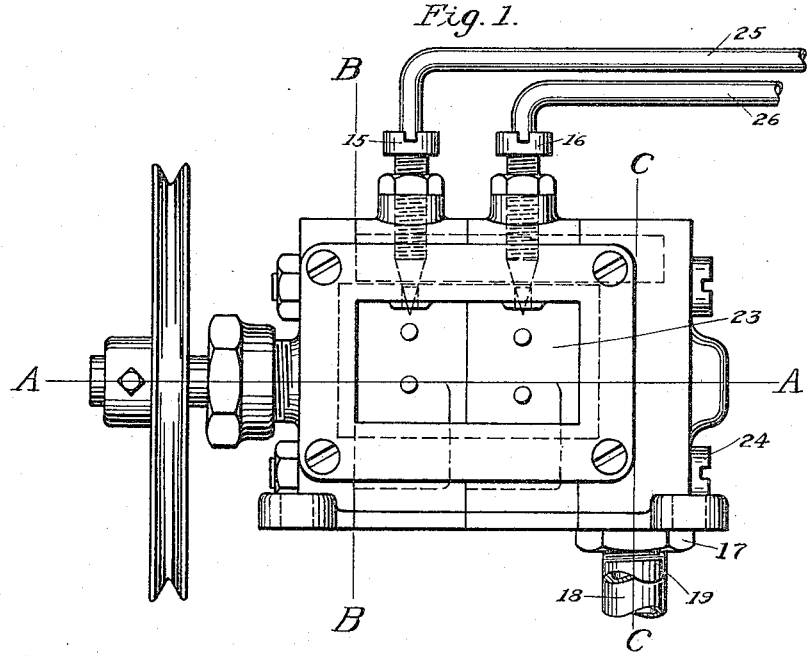

Figure 1 is a front view of my invention, Fig. 2 is a sectional view on the line A—A in Fig. 1. Fig. 3 is a view in section on the line B—B in Fig. 1, and Fig. 4 is a view in section on the line C—C in Fig. 1, and also showing my invention as connected with an oil reservoir.

Similar figures refer to similar parts throughout the several views.

Reservoir 1 may be any suitable oil tank or container. Transfer tube 18, which may be of any desired length, provides the necessary connection between the oiler and oil supply.

From reservoir 1, the oil is drawn through tube 18 into a closely fitting chamber about closely meshed gears 3 and 4, which rotate in the direction indicated by the arrow upon gear 4.

Gears 3 and 4 by their rotation within the closely fitting chamber, force the oil through a suitable passageway 22 into a receptacle 20, and thereby maintain receptacle 20 constantly filled with oil. Receptacle 20 is provided with an outlet through tube 19, in which there is a ball valve and tension spring adapted to permit the escapement of oil from chamber 20 back to the supply reservoir 1 after a predetermined pressure is obtained in chamber 20 thereby maintaining a uniform pressure therein. Tube 19 is suitably fitted and provided with a set-nut 17, and constructed so that by screwing tube 19 into the frame any desired tension may be reproduced upon the spring and ball valve at the overflow outlet of receptacle 20. The overflow outlet from receptacle 20 may be positioned at any desired point in the chamber, but preferably in the position shown in the drawing.

Gears 3 and 4 are rigidly mounted upon shafts 12 and 13 respectively. Shaft 13 is driven by pulley 14, or may be driven in any other suitable manner and drives shaft 12 through gears 4 and 3, and the other gears similarly mounted upon each of the shafts.

Chamber 20 is provided with two adjustable needle valves 15 and 16, each of which permit the escapement of oil into a separate chamber or receptacle formed beween the frame and the glass cover 23 of the oiler.

The oil, which is permitted to escape through needle valve 15 drips into a separate compartment in the chamber formed between part of the frame 8 and the transparent cover 23 and fills tube 21. Gears 9 and 10, which are rigidly mounted upon shafts 12 and 13 respectively, and which rotate as indicated by the arrow upon gear 10 and within a closely fitting chamber in part of the frame 8 force the oil out through tube 25 which carries the oil to the desired point to be lubricated.

The oil which passes through valve 16 is similarly pumped and forced by gears 6 and 7 out through tube 26.

While but two outlet tubes are shown in the drawings any number may be added by simply lengthening shafts 12 and 13, and adding units or sections identical with that shown in section in Fig. 3.

The frame of the machine consists of the two end pieces 2 and 11 and the similar housings 5 and 8 for the pump sections which are in every way identical in construction. This frame is secured together by means of four bolts 24.

Driving pulley or gear 14 may be mounted upon either end of shafts 12 or 13 in the same manner as shown to be mounted upon one end of shaft 13 in the drawings, thereby giving a large range of position, and a choice as to which direction the pulley shall rotate.

The facilities provided in my invention and the sectional construction thereof render possible a lower manufacturing cost than has heretofore been obtained by any similar apparatus.

An advantage, which this oiler has in conjunction with its advantages in construction and operation already indicated, is that it may be located wherever desired without reference to the location of the oil supply or reservoir.

Having already demonstrated in actual service the complete and satisfactory attainment of all of the objects indicated, nothing remains or need be said concerning the probabilities of the demand or use of this invention.

I consider this invention so simple and practical that I desire to claim the same without limitation to its use as a mechanical oiler for internal combustion engines, but as a distributer for liquids of whatever kind or for whatever purposes where the mechanism described may be utilized.

I claim:

1. In a machine of the kind described a drive shaft and means for driving the same, a driven shaft, a pumping unit comprising a gear upon the drive shaft, a gear upon the driven shaft, and a housing about said gears, means for connecting said pumping unit with a source of oil supply, a chamber and means for connecting the same with said pumping unit, said chamber being adapted to receive the oil pumped by said pumping unit, a valve in said chamber adapted to permit the escapement of oil therefrom when filled and upon the attainment of a predetermined pressure in said chamber, several outlets from said chamber, means for connecting each of said outlets with a separate pump member comprising a gear upon the drive shaft, a gear upon the driven shaft, and a housing about said gears, means for distributing the oil pumped from each of said pump members.

2. In a machine of the kind described a drive shaft and means for driving the same, a driven shaft, a pumping unit comprising a gear upon the drive shaft, a gear upon the driven shaft, and a housing about said gears, means for connecting said pumping unit with a source of oil supply, a chamber and means for connecting the same with said pumping unit, said chamber being adapted to receive the oil pumped by said pumping unit, a valve in said chamber adapted to permit the escapement of oil therefrom when filled and upon the attainment of a predetermined pressure in said chamber, several outlets, a regulating valve upon each of said outlets adapted to provide a means for regulating the amount of oil permitted to pass through each of said outlets, from said chamber, means for connecting each of said outlets with a separate pump member comprising a gear upon the drive shaft, a gear upon the driven shaft, and a housing about said gears, means for distributing the oil pumped from each of said pump members.

3. In a machine of the kind described a drive shaft and means for driving the same, a driven shaft, a pumping unit comprising a gear upon the drive shaft, a gear upon the driven shaft, and a housing about said gears, means for connecting said pumping unit with a source of oil supply, a chamber and means for connecting the same with said pumping unit, said chamber being adapted to receive the oil pumped by said pumping unit, a valve in said chamber adapted to permit the escapement of oil therefrom when filled and upon the attainment of a predetermined pressure in said chamber, means for adjusting said valve adapted to change the pressure at which the oil is permitted to escape from said chamber through said valve, several outlets from said chamber, means for connecting each of said outlets with a separate pump member comprising a gear upon the drive shaft, a gear upon the driven shaft, and a housing about said gears, means for distributing the oil pumped from each of said pump members.

4. In a machine of the kind described a drive shaft and means for driving the same, a driven shaft, a pumping unit comprising a gear upon the drive shaft, a gear upon the driven shaft, and a housing about said gear, means for connecting said pumping unit with a source of oil supply, a chamber and means for connecting the same with said pumping unit, said chamber being adapted to receive the oil pumped by said pumping unit, a valve in said chamber adapted to permit the escapement of oil therefrom when filled and upon the attainment of a predetermined pressure in said chamber, means for adjusting said valve adapted to change the pressure at which the oil is permitted to escape from said chamber through said valve, several outlets, a regulating valve upon each of said oulets adapted to provide a means for regulating the amount of oil permitted to pass through each of said outlets from said chamber, means for connecting each of said outlets with a separate pump member comprising a gear upon the drive shaft, a gear upon the driven shaft, and a housing about said gears, means for distributing the oil pumped from each of said pump members.

5. In a machine of the kind described a drive shaft and means for driving the same, a driven shaft, a pumping unit comprising a gear upon the drive shaft, a gear upon the driven shaft, and a housing about said gears, means for connecting said pumping unit with a source of oil supply, a chamber and means for connecting the same with said pumping unit, said chamber being adapted to receive the oil pumped by said pumping unit, a valve in said chamber adapted to permit the escapement of oil therefrom when filled and upon the attainment of a predetermined pressure in said chamber, means for adjusting said valve adapted to change the pressure at which the oil is permitted to escape from said chamber through said valve, several outlets, a regulating valve upon each of said outlets adapted to provide a means for regulating the amount of oil permitted to pass through each of said outlets from said chamber, means for connecting each of said outlets with a separate pump member comprising a gear upon the drive shaft, a gear upon the driven shaft, and a housing about said gears, means for distributing the oil pumped from each of said pump members, each of said last mentioned pump members being similarly constructed and adapted to be built sectionally.

WALTER J. McVICKER.

Witnesses:
ELIZABETH C. KELLY,
S. S. DUDLEY.

Copies of this patent may be obtained for five cents each, by addressing the "Commissioner of Patents, Washington, D. C."